Oct. 17, 1939.  F. LANE ET AL  2,176,532
HYDRAULIC ROTARY JOINT FOR PIPES OR THE LIKE
Filed Feb. 27, 1939  2 Sheets-Sheet 1

Inventors
Francis Lane
John S Lane
by John E Eastes
Attorney

Oct. 17, 1939.  F. LANE ET AL  2,176,532
HYDRAULIC ROTARY JOINT FOR PIPES OR THE LIKE
Filed Feb. 27, 1939   2 Sheets-Sheet 2

Inventors
Francis Lane
John S Lane
John E. Easthof
Attorney

Patented Oct. 17, 1939

2,176,532

UNITED STATES PATENT OFFICE 2,176,532

HYDRAULIC ROTARY JOINT FOR PIPES OR THE LIKE

Francis Lane and John Skelding Lane, Brierley Hill, England

Application February 27, 1939, Serial No. 258,844
In Great Britain August 10, 1938

8 Claims. (Cl. 285—97.8)

This invention relates to a hydraulic rotary joint for pipes or the like and a particular object is to provide means whereby fluid under pressure can be passed from a stationary pipe line or member to a rotating member without loss or seepage of fluid at the junction of the stationary and rotating components, even at pressures in excess of 1000 lbs. per square inch.

An important object is to provide a rotary joint in which there are no screwed parts between the stationary and rotating members, thus avoiding possibility of the parts tightening or loosening whilst the apparatus is in operation.

Another object is to provide a construction whereby the parts can be readily disconnected for enabling inspection.

A further object is to provide against end pressure or reaction exerted by the rotating member.

Another object is means enabling the rotating member to turn in either a clockwise or anti-clockwise direction.

According to the invention, a rotating tubular member fixed to the device to be supplied with fluid carries a stationary pipe fitting therein and is provided with a divided gland which houses a cup washer secured to the tubular member between which and the pipe, the cup-washer interposes and co-acts with a floating washer to provide a secondary sealing effect around the stationary pipe.

Also according to the invention, the stationary pipe is at its inner end within the rotary tubular member furnished with a cup washer to provide an initial fluid seal, but should this fail or partially fail to act, the secondary fluid seal will check leakage.

The invention is described in the following specification with reference to the accompanying drawings wherein.

Figure 1:
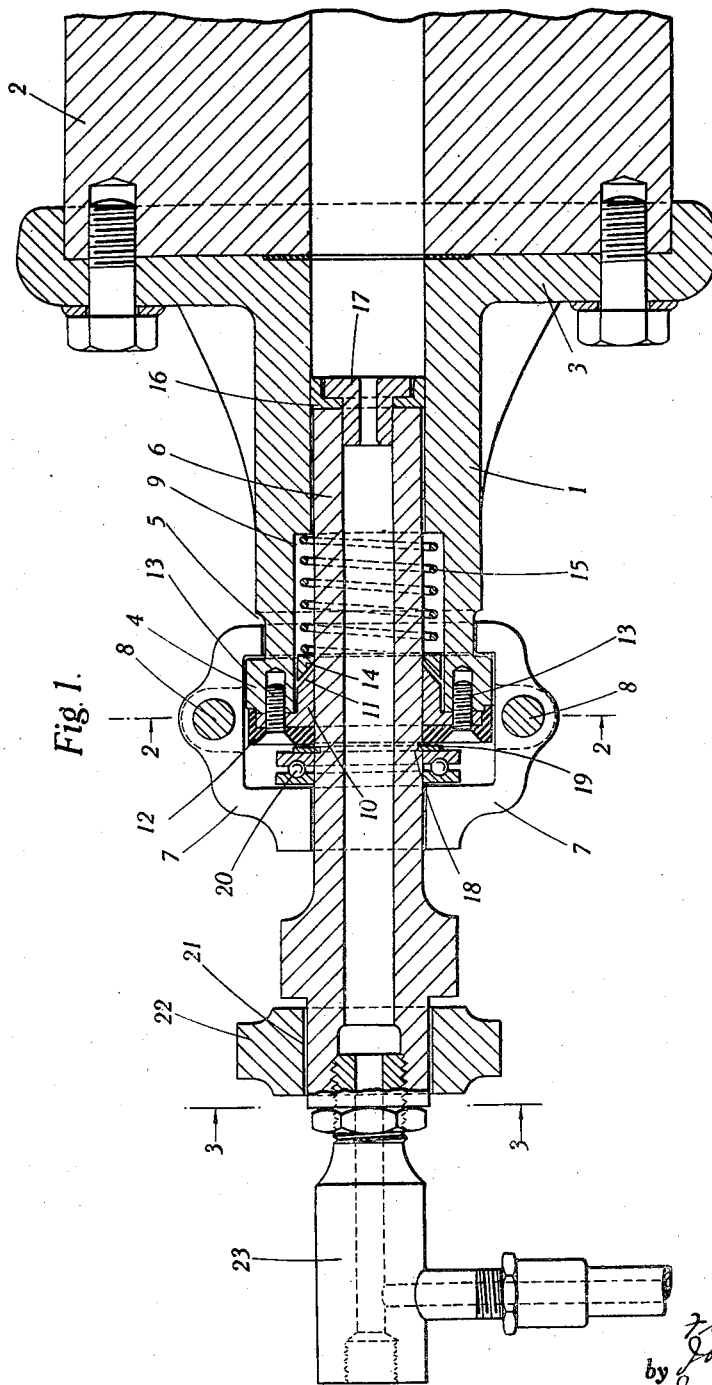
Figure 1 is a longitudinal sectional plan of a hydraulic rotary joint constructed in accordance with our invention.
Figure 2:
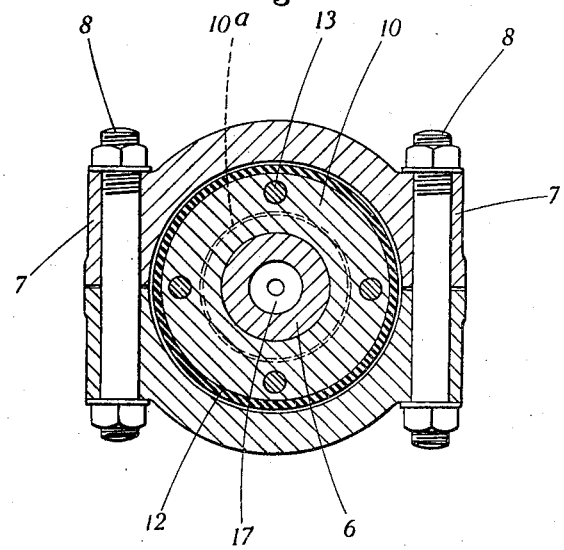
Figure 2 is a cross section on line 2—2 of Figure 1.
Figure 3:
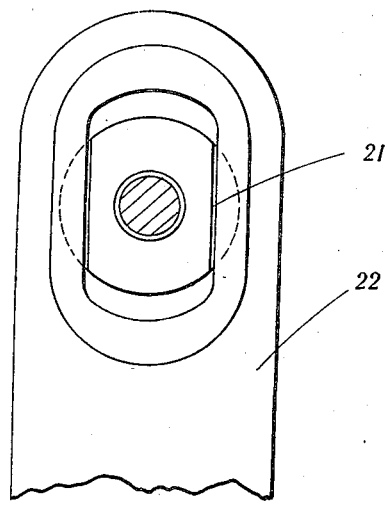
Figure 3 is a section at line 3—3 of Figure 1.

In a convenient embodiment of the invention, the assembly comprises a rotary tubular member 1 attached by bolts to the drumshaft 2 of a haulage engine or other device to be supplied with fluid, said rotary tubular member having a dished attachment plate 3 at the forward end and a peripheral collar 4 at the rearward end, the collar 4 providing a neck 5 on the forward side thereof. The rotary tubular member 1 at its rearward end receives interiorly a stationary centre tube 6 which has a sliding fit therein. About the collar 4 of the rotary tubular member 1 is a split or divided gland 7 which also surrounds a part of the stalk of the stationary centre tube 6 projecting from the said rotary tubular member. The gland 7 in which the split or divided sections are held by clamping screws 8 has its forward part adapted to engage the neck 5 of the rotary tubular member 1 whereby it is located in position.

The rotary tubular member 1 has an enlarged bore for part of its length extending inwards from the open end thereof so that an annular recess 9 is provided between the rotary tubular member 1 and the stationary centre tube 6. To the rotary tubular member 1 is attached an internal hollow cup washer 10 of leather or like flexible material having its cylindrical part embracing the stationary centre tube 6 and closely fitting the recess 9 between the rotary tubular member 1 and the stationary centre tube 6, and having its radial attachment flange bearing against the face of the collar 4 of the rotary tubular member 1, said cylindrical part having a leading conical edge 11. A locking plate 12 bears against the attachment flange of the cup washer 10 and receives screws 13 which pass through the flange of the cup washer 10 into tapped holes in the end collar part of the rotary tubular member 1.

Within the recess of the rotary tubular member 1 and at the inward side of the cup washer 10 is a floating washer 14 which encircles the stationary centre tube 6 and has a conical edge to engage the leading conical edge 11 of the cup washer 10. The floating washer 14 is exerted into contact with the cup washer 10 by a coil compression spring 15 located in the said recess 9, thus providing a secondary fluid seal around the stationary centre tube 6, and preventing seepage of fluid when the pressure in the line is less than 5 lbs. per square inch.

The inner end of the stationary centre tube 6 situated within the rotating tubular member 1 is furnished with a cup washer 16 located in position by a hollow plug 17 to furnish a primary fluid seal.

Two independent sealing washers are thus provided, so that in the event of the initial fluid seal failing, or partially failing, the secondary fluid seal will effectually act to prevent leakage.

The stationary centre tube 6 in the part located within the gland 7 and at the front of the locking plate 12 is cut with an annular groove 18 in which is fitted a steel circlip 19 which bears against the forward face of a ball thrust race 20 positioned against the inner face of the split locking gland 7. This means is devised to prevent axial outward movement of the stationary centre tube 6 from the rotating tubular member 1.

The rear end of the stationary centre tube 6 may have flats 21 engaging with an arm or carrier bracket 22 secured in a rigid position to maintain the centre tube 6 stationary. A pipe holder 23 to which is connected a feed pipe is screwed into the end of the stationary centre tube 6 for communicating with any source of supply.

The stationary centre tube 6 can be easily withdrawn for inspection by removing the clamping screws 8 from the locking gland 7, the split members of which can then be detached from the rotary tubular member 1.

Having thus described the invention, what we claim is:

1. A hydraulic rotary joint for pipes comprising a rotating tubular member fixed to the drumshaft of a haulage engine or other rotating body, a stationary centre tube interiorly engaging the tubular member and having a gland which houses a cup washer secured to the tubular member between which and the centre tube, the cup washer interposes and co-acts with a floating washer to provide a secondary fluid seal.

2. A hydraulic rotary joint for pipes comprising a rotating tubular member attached to the drumshaft of a haulage engine or like rotary body, a stationary centre tube slidably engaging the bore of the tubular member, an expanded collar upon the end of the tubular member, a gland embracing the end of the tubular member, a cup washer engaging between the tubular member and stationary centre tube, a locking washer attaching the cup washer to the tubular member, and a floating washer co-operating with the cup washer.

3. A hydraulic rotary joint for pipes comprising a rotating tubular member attached to the drumshaft of a haulage engine or like rotary body, a stationary centre tube slidably and externally engaging the tubular member, an external collar upon the outer end of the tubular member providing a recessed neck behind same, a gland embracing the collar part of the tubular member and engaging the recessed neck, an enlarged bore in the tubular member providing an annular recess around the stationary centre tube, a cup washer attached to the tubular member and engaging the annular recess, and a floating washer co-acting with the cup washer to provide a fluid seal.

4. A hydraulic rotary joint for pipes comprising a rotating tubular member affixed to the rotating body conducting the fluid, a stationary centre tube slidably positioned within the tubular member, a cup washer engaging the inner end of the stationary tube serving as an initial seal, a collar upon the end of the rotating tubular member, a gland about the collar part of the tubular member, an annularly recessed part within the tubular member, a cup washer housed within the gland, a floating washer in the recessed part co-acting with the cup washer to provide a secondary fluid seal, and means for securing the cup washer to the end of the rotating tubular member.

5. A hydraulic rotary joint for pipes comprising a rotating tubular member fixed to the rotating member conducting the fluid, a stationary centre tube telescopically engaging within the tubular member which is provided with an annular recess about the stationary centre tube, a gland upon the tubular member, a cup washer within the gland abutting against the end of the tubular member, with said cup washer having its cylindrical part with a leading conical edge and engaging the annular recess, a floating washer within the recess with a conical edge bearing against the conical edge of the cup washer, a locking plate bearing against the face of the cup washer, a bevel-edged floating washer within the annular recess and about the stationary centre tube urged against the cup washer, and a circlip engaging an annular groove in the stationary centre tube.

6. A hydraulic rotary joint for pipes comprising a rotating tubular member fixed to the rotating body conducting the fluid, a stationary centre tube slidably fitted within the tubular member, an annular recess bored in the tubular member surrounding the centre tube, an external collar upon the end of the tubular member providing a neck at the back thereof, a cup washer abutting against the collar part of the tubular member, a locking plate bearing upon the cup washer and attaching it to the tubular member, a spring pressed floating washer having a bevel edge bearing against the cylindrical part of the cup washer, a ball thrust race upon the centre tube and abutting against the inner face of the gland, a circlip engaging an annular groove in the centre tube and means for holding the centre tube stationary.

7. A hydraulic rotary joint for pipes comprising a rotating tubular member fixed to the rotating body conducting the fluid such as a drumshaft of a haulage engine, a stationary centre tube slidably fitted within the tubular member, an annularly recessed part within the tubular member about the centre tube, a tapped collar upon the tubular member so forming an external grooved neck, a gland surrounding the tubular member and positioned and retained by it engaging the neck, a cup washer having its cylindrical part within the annular recessed part of the tubular member and formed with a leading conical edge, a floating washer with a conical edge located within the recessed part about the centre tube and bearing against the conical edge of the cup washer under the action of compression spring disposed within said recessed part, an apertured clamping plate within the gland and surrounding the centre tube bearing against the face of the cup washer and clamping the latter to the end of the tubular member, clamping screws passed through the apertures of the clamping plate into the tapped holes in the collar part of the tubular member and a circlip engaging a groove in the centre tube.

8. A hydraulic rotary joint for pipes comprising a rotating tubular member connected to a drum shaft or like member of a rotating body, a stationary centre tube slidably fitted within the tubular member, an annularly recessed part bored within the tubular member, a collar upon the tubular member, a gland embracing the tumular member and centre tube and held in position by the collar, a cup washer attached to the inner end of the centre tube and bearing against the bore of the outer tubular member constituting an initial fluid seal, a conical edged cup-washer within the gland and attached to the collar part of the tubular member by a clamping plate, a floating washer with a coned edge bearing against the conical edge of the cup washer so that the cup washer and co-acting floating washer constitute a secondary fluid seal, a circlip engaging an annular groove in the centre tube, a ball thrust race about the centre tube and abutting against the inner wall of the gland, and flats upon the centre tube for engaging an arm or carrier bracket to hold the centre tube stationary.

FRANCIS LANE.
JOHN S. LANE.